(12) United States Patent
Magnusson

(10) Patent No.: US 8,844,497 B2
(45) Date of Patent: *Sep. 30, 2014

(54) METHOD OF OPERATING A DUAL FUEL COMBUSTION ENGINE OF THE DIESEL-TYPE AND A DUAL FUEL COMBUSTION ENGINE OF THE DIESEL-TYPE OPERABLE ACCORDING TO SUCH METHOD

(75) Inventor: Ingemar Magnusson, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 424 days.

This patent is subject to a terminal disclaimer.

(21) Appl. No.: 13/381,956

(22) PCT Filed: Jul. 3, 2009

(86) PCT No.: PCT/SE2009/000352

§ 371 (c)(1),
(2), (4) Date: Feb. 22, 2012

(87) PCT Pub. No.: WO2011/002353

PCT Pub. Date: Jan. 6, 2011

(65) Prior Publication Data

US 2012/0272935 A1 Nov. 1, 2012

(51) Int. Cl.
| | | |
|---|---|---|
| *F02B 3/10* | (2006.01) | |
| *F02D 41/00* | (2006.01) | |
| *F02D 41/30* | (2006.01) | |
| *F02D 19/08* | (2006.01) | |
| *F02D 19/10* | (2006.01) | |
| *F02D 19/06* | (2006.01) | |
| *F02B 3/06* | (2006.01) | |

(52) U.S. Cl.
CPC .............. *F02D 19/10* (2013.01); *F02D 19/066* (2013.01); *Y02T 10/36* (2013.01); *F02D 41/0025* (2013.01); *F02D 41/3029* (2013.01); *F02B 3/06* (2013.01); *F02D 19/061* (2013.01); *F02D 19/081* (2013.01); *F02D 41/3035* (2013.01); *F02D 19/0636* (2013.01)
USPC ........................................................ 123/299

(58) Field of Classification Search
USPC ......... 123/299, 300, 305, 1 A, 431, 575, 488, 123/525, 568.11; 701/103–105
See application file for complete search history.

(56) References Cited

U.S. PATENT DOCUMENTS

| | | |
|---|---|---|
| 4,955,326 A | 9/1990 | Helmich |
| 5,365,902 A | 11/1994 | Hsu |

(Continued)

FOREIGN PATENT DOCUMENTS

WO 0159280 A1 8/2001

OTHER PUBLICATIONS

Supplementary European Search Report (Mar. 28, 2013) for corresponding European App. EP 09 84 6900.

(Continued)

*Primary Examiner* — Hai Huynh
(74) *Attorney, Agent, or Firm* — WRB-IP LLP

(57) ABSTRACT

A method of operating a dual fuel internal combustion engine of the diesel-type is provided. The method includes pre-mixing a first fuel in a combustion chamber and/or in an inlet port, compressing a charge containing the first fuel to conditions that allow auto-ignition of a second fuel, performing a first injection of the second fuel into the combustion chamber to initiate auto-ignition of the second fuel for igniting the first fuel, thereby initiating conditions for pre-mixed flame propagation combustion of the first fuel. At least one subsequent injection is performed in which additional kinetic energy is supplied into the combustion process to thereby enhance turbulence intensity and propagation speed of the flame and/or enhance late mixing in the combustion chamber, so a to improve late oxidation during combustion. A dual fuel combustion engine of the diesel engine type.

16 Claims, 2 Drawing Sheets

(56) References Cited

U.S. PATENT DOCUMENTS

2002/0017269 A1 2/2002 Zur Loye et al.
2004/0149255 A1 8/2004 zur Loye et al.
2005/0224044 A1 10/2005 Stojkovic et al.
2012/0136556 A1* 5/2012 Magnusson .................. 701/104

OTHER PUBLICATIONS

International Search Report for corresponding International Application PCT/SE2009/000352.
International Preliminary Report on Patentability for corresponding International Application PCT/SE2009/000352.

* cited by examiner

METHOD OF OPERATING A DUAL FUEL COMBUSTION ENGINE OF THE DIESEL-TYPE AND A DUAL FUEL COMBUSTION ENGINE OF THE DIESEL-TYPE OPERABLE ACCORDING TO SUCH METHOD

BACKGROUND AND SUMMARY

This invention relates to a method of operating a dual fuel internal combustion engine of the diesel-type and a dual fuel internal combustion engine of the diesel-type operable according to such method.

Dual fuel internal combustion engines of the diesel-type usually comprise a combustion chamber being at least partly delimited by a piston, a first fuel supply for a first fuel, said first fuel supply being located in the combustion chamber or in an inlet port thereof, and a second fuel supply for a second fuel.

A known method to operate internal combustion engines as described above comprises the steps of:
- pre-mixing said first fuel in said combustion chamber and/or in said inlet port
- compressing the charge containing the first fuel to conditions that allow auto-ignition of the second fuel,
- igniting said first fuel in said combustion chamber by injection and auto-ignition of a second fuel to thereby initiate conditions for pre-mixed flame propagation combustion.

Such a method may generally be described as an operation mode distinguished by pre-mixed flame propagation combustion. For briefness, in the following, such a method will also be referred to as a "flame propagation mode".

The present invention relates to the field of dual fuel engines of the diesel-type, in particular such that are suitable for heavy load.

One field of application for such engines is in vehicles, such as trucks, lorries and buses. Other fields of application are ships and boats or power generation using internal combustion engines.

For heavy-load engines, diesel oil is conventionally used as the fuel. Accordingly, there is a vast number of diesel engines whose design and function have been optimised for heavy loads. At present, there is however a great interest for enabling heavy-load engines to run on alternative fuels, such as natural gas or biogas.

The present invention relates to such diesel-type engines, but which have been adapted for use with fuels other than diesel. Hence, in this context, what is meant with a diesel-type engine is in a broader meaning that type of engine which would function satisfactory with conventional diesel fuel.

To this end, a number of dual fuel engines have been proposed. For example, it has been suggested to use a natural gas as the main fuel in a diesel-type engine. When natural gas is used as a primary fuel in a diesel-type engine, it has been proposed to use a
combustion process wherein the natural gas is first pre-mixed with air, whereafter a pilot injection of the second fuel is used for triggering ignition. Thereafter, pre-mixed flame propagation combustion takes place in the combustion chamber.

U.S. Pat. No. 4,955,326 describes such a dual fuel engine system wherein the dual fuel engine includes a fuel oil supply and a fuel gas supply. Means connected between the fuel oil supply and the engine injects small amounts of diesel fuel into the engine. The injection of diesel fuel is limited to pilot injection quantities only.

A problem with engines of the above-mentioned type is that they may suffer from problems with knock. This is believed to be due to uncontrolled auto-ignition of the unburned fuel ahead of the flame, a problem that is enhanced in heavy duty engines by large combustion chamber volumes and low engines speed as compared to light duty engines, and by low local flame propagation velocities as compared to engines designed for pre-mixed charge operation, as for instance gasoline-type of engines.

It is desirable to provide an enhanced method for operating a dual fuel combustion engine of the diesel-type, which is suitable for heavy vehicles.

Preferably, the method should diminish the problems with knock as encountered in prior art engines and, as a consequence, improve fuel efficiency and preferably decrease exhaust emissions of unburned hydrocarbons and CO.

Preferably, the method should enable fuel efficiency similar to that of a conventional diesel engine.

Generally, it is desired that the method should enable combustion with low soot and NOx emissions.

In view of the above, it will be understood that there is also a need for a dual fuel internal combustion engine of the diesel-type for carrying out a method as desired above.

In accordance with an aspect of the invention there is provided a method of operating a dual fuel internal combustion engine of the diesel-type, comprising a combustion chamber being at least partly delimited by a piston, a first fuel supply for a first fuel, said first fuel supply being located in or at the combustion chamber and/or in or at an inlet port thereof, and a second fuel supply for a second fuel, the method comprising the steps of:
- Pre-mixing said first fuel in said combustion chamber and/or in said inlet port,
- compressing the charge containing the first fuel to conditions that allow auto-ignition of the second fuel,
- performing a first injection of the second fuel into said combustion chamber to initiate auto-ignition of said second fuel for igniting said first fuel, thereby initiating conditions for pre-mixed flame propagation combustion of the first fuel.

Further, the method comprises the step of performing at least one subsequent injection, said subsequent injection supplying additional kinetic energy into the combustion process to thereby enhance turbulence intensity and propagation speed of said flame and/or enhance late mixing in the combustion chamber, so a to improve late oxidation during combustion of the remaining fuel.

Hence, in accordance with the invention, at least one subsequent injection may be used to add kinetic energy to the combustion process. The additional kinetic energy provided by the subsequent injection (or subsequent injections) may be used to create additional small-scale turbulence in the region of the flame in the combustion chamber, which in turn enhances the propagation speed of said flame. Accordingly, the flame front will develop faster and reach into the combustion chamber in shorter time than without such additional turbulence, resulting in a more favourable combustion chamber pressure development over time, resulting in turn in higher (fuel) efficiency of the engine and less risk for knock compared with conventional dual fuel combustion processes without this additional turbulence.

Alternatively, or in addition to a subsequent injection to create additional turbulence, the method may include an additional step of performing a subsequent injection (or subsequent injections) for enhancing late mixing in the combustion chamber so as to improve final oxidation during combustion. Such a subsequent injection may be referred to as a "post-injection". The purpose of the post-injection-type subsequent injection is, as the purpose of the previously described subsequent injections, to add kinetic energy to the combustion process. However, the kinetic energy added by the post-injection will not primarily be utilised as to increase the flame speed. Instead, the kinetic energy from the post-injection is supplied so as to create turbulence in the later stages of the combustion cycle and hence enhance late global and local mixing of gases remaining in the combustion chamber for improving late oxidation during combustion of the remaining fuel.

Advantageously, said first fuel is pre-mixed for instance with air and/or recycled exhaust gas, to form the charge containing the first fuel.

The first injection of the second fuel into the combustion chamber is sufficient to initiate ignition and hence to initiate pre-mixed flame propagation combustion. In contrast, the purpose of the subsequent injection (or subsequent injections) (after said first injection of the second fuel) is to add kinetic energy initiating additional small scale turbulence in the region of the propagating flame or enhancing mixing of gases in the combustion chamber. Accordingly, the subsequent injections need not necessarily add any fuel to the combustion process. Any gaseous or liquid matter, which may transfer kinetic energy via an injection thereof and which does not disturb the combustion process, may be used.

It is preferred to inject a liquid for the subsequent injections, since the necessary quantity of supplied kinetic energy and the administration of the injections may generally be easier to achieve with liquids than with injection of gaseous matter. In view of the above, any liquid which does not disturb the combustion process could be injected, such as e.g. water. It is to be understood however, that with injection of a liquid is meant that the substance is in its liquid phase at the precise moment of injection. Once injected, the liquid will, for typical conditions, transfer to gaseous phase with a rate depending on the combustion chamber conditions, the injection process and the properties of the liquid. Hence, even when the subsequent injections are liquid injections, a large fraction of the kinetic energy is transferred and a large fraction of the turbulence is created by impact of the injected substance while in its gaseous phase.

However, for practical purposes, it is preferred that the subsequent injection is an injection of a fuel. Most preferred, the subsequent liquid injection is of the same fuel as the first injection, that is, of the second fuel. As such, no additional constructive or engine design arrangements for the subsequent injections are necessary.

Preferably, the amount of additional kinetic energy supplied by the at least one subsequent injection is variable.

As mentioned above, it is envisaged to use a combustion cycle comprising at least one subsequent injection, but several subsequent injections may also be used.

Advantageously, the amount of additional kinetic energy supplied by these subsequent injections is variable by varying at least one of: the number of subsequent injections, the injection pressures of the subsequent injections, the durations of the subsequent injections, or the dwell time between subsequent injections. In this context it is to be understood that the amount of additional kinetic energy supplied may be varied between subsequent injections of the same combustion cycle, and/or be varied between subsequent injections belonging to different combustion cycles.

Advantageously, the amount of kinetic energy supplied by the subsequent injection is varied in accordance with feedback supplied from at least one sensor sensing at least one of: the combustion process, the fuels and their parameters as temperature, pressure, time, quality of fuel, etc. and/or the results of said combustion process including but not limited to the resulting chemical compounds produced by such combustion process and contained in the exhaust gas of the engine. The control of the at least one subsequent injection may then be performed using feedback from said sensor as input. Accordingly, the combustion process may be continuously surveyed and the subsequent injections continuously controlled to improve said combustion process. Advantageously, in a startup phase a first combustion cycle or a first few combustion cycles may be run using selected start parameters for the subsequent injection, whereafter the sensor is used for evaluating said first combustion cycle or the first few combustion cycles, and providing input for the adjustment of the subsequent injection for the following combustion cycles in the normal operational phase of the engine. Accordingly, the combustion process may be adapted for a specific situation. Moreover, this enables a more robust combustion process, since the subsequent injections may also be adapted if the conditions should vary during continuous operation of the engine.

As an alternative to initiating the first combustion cycle or the first few combustion cycles with selected start parameters for the subsequent injection, in the start-up phase the first combustion cycle or the first few combustion cycles could be run without any subsequent injection at all.

The sensor(s) may advantageously be sensor(s) for sensing for instance the quality of the supplied fuel, preferably for sensing the octane number. Such sensors could be provided e.g. in the fuel tank or fuel supply system.

Alternatively, in addition or in combination with such a fuel quality sensor, the method may use a sensor for sensing the quality of the combustion. Various such sensors may be applicable. One known type of sensor is a so called knock-sensor. Preferably, a device for sensing the combustion chamber pressure could be used in combination with a method for a fast evaluation (on a cycle-to-cycle basis) of the heat release.

Preferably, the first fuel is a fuel with high octane number, preferably greater than 90. Advantageously, the first fuel is a gaseous fuel, preferably natural gas or biogas.

Preferably, the second fuel is a fuel with high cetane number, preferably greater than 40. Advantageously, said second fuel is a liquid fuel, preferably diesel oil, bio-diesel or DME (dimethyl ether).

Advantageously, said first fuel is pre-mixed with air and/or recycled exhaust gas.

In a second aspect of the invention, there is provided a dual fuel internal combustion engine of the diesel-type comprising:
  a combustion chamber being at least partly delimited by a piston,
  a first fuel supply for a first fuel, said first fuel supply being located in or at the combustion chamber and/or in or at an inlet port thereof,
  a second fuel supply for a second fuel,
  said first fuel being pre-mixed in said combustion chamber and/or said inlet port,
  at least one device for compressing the charge containing the first fuel to conditions that allow auto-ignition of the second fuel,
  at least one injector device for performing a first injection of the second fuel into said combustion chamber to initiate auto-ignition of said second fuel for igniting said first fuel, thereby initiating conditions for pre-mixed flame propagation combustion of the first fuel, wherein
  at least one injector device for performing at least one subsequent, preferably liquid, injection, so as to supply additional kinetic energy into the combustion process to thereby enhance turbulence intensity and propagation speed of said flame and/or enhance late mixing in the combustion chamber so as to improve late oxidation during combustion of the remaining fuel.

Preferably, the dual fuel internal combustion engine comprises at least one sensor for providing feedback from the combustion process, wherein the output from said sensor is used for said control of the at least one subsequent, preferably liquid, injection.

Preferably, the dual fuel internal combustion engine comprises a sensor for sensing the quality of the combustion, or the quality of the supplied fuel.

It should be realised that alternatives and advantages as described above in relation to the method applies equally to the dual fuel internal combustion engine according to the invention.

BRIEF DESCRIPTION OF THE DRAWINGS

The invention will now be described in more detail by non-limiting examples as described in the following, and with reference to the accompanying drawings wherein.

DETAILED DESCRIPTION

As stated above, in accordance with the invention there is provided a method of operating a dual fuel internal combustion engine of the diesel-type, comprising a combustion chamber being at least partly delimited by a piston, a first fuel supply for a first fuel, said first fuel supply being located in the combustion chamber or in an inlet port thereof, and a second fuel supply for a second fuel, the method comprising:

pre-mixing said first fuel in said combustion chamber and/or in said inlet port, compressing the charge containing the first fuel to conditions that allow auto-ignition of the second fuel, performing a first injection of the second fuel into said combustion chamber to initiate auto-ignition of said second fuel for igniting said first fuel, thereby initiating conditions for pre-mixed flame propagation combustion of the first fuel. Further, the method comprises the step of:

performing at least one subsequent injection, said subsequent injection supplying additional kinetic energy into the combustion process to thereby enhance turbulence intensity and propagation speed of said flame and/or enhance late mixing in the combustion chamber, so as to improve late oxidation during combustion of the remaining fuel.

Figure 1:
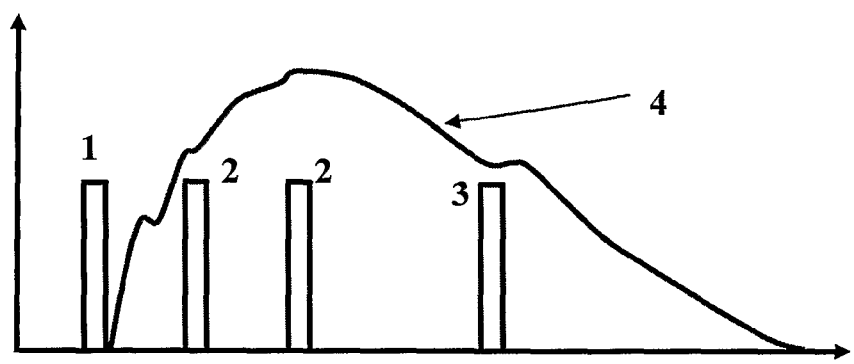
FIG. 1 provides a schematic illustration of the rate of heat release curve as a function of time and in relation to the injections in an embodiment of a method in accordance with the invention.

FIG. 1 is intended to schematically illustrate (in a simplified manner) the timing of the first injection of the second fuel and of the subsequent injections in relation to the rate of heat release. In FIG. 1, the horizontal dimension represents time, or crank angle interval, during a combustion cycle. The vertical dimension mirrors (i) the rate of heat release of the combustion process when relating to the rate of heat release curve 4, and (ii) the rate of injected fuel mass when relating to the injections 1, 2, 3.

The first of the injections 1, 2, 3 (injection 1) is the "first injection" of the second fuel which is used for igniting the first fuel by injection and auto-ignition of the second fuel. The first injection 1 of the second fuel hence contributes to triggering the propagation of the flame. Accordingly, the rate of heat release rises quickly soon after the first injection 1. A fraction of the early heat release corresponds to the combustion of the second fuel injected in the first injection 1.

The two following injections are "subsequent injections" 2, which supply additional kinetic energy to the combustion process so as to enhance the turbulence intensity and the propagation speed of the flame. Accordingly, the subsequent injections may, but need not be, of the second fuel. As illustrated in FIG. 1, the subsequent injections 2 take place during the combustion process. In particular, in this case, the subsequent injections are made before the peak of the rate of heat release curve 4. The selected number n of "subsequent" injection pulses to n=2 (denoted 2 in FIG. 1) is only exemplary, i.e. the number of such injection pulses may be varied dependent on the circumstances of the individual case or the individual situation and can be any natural number n equal to or greater than 1, for instance n=1, 2, 3, 4, 5, 6, 7, 8, 9, 10 and so on.

Since the object of the subsequent injections 2 is to increase turbulence intensity so as to speed up the flame propagation, it may be generally desired to perform the subsequent injections before the flame has propagated to the combustion chamber walls.

In the illustrated example, another subsequent injection 3, being of the post-injection-type is performed after the peak of the heat release curve 4, when the heat release has started to decline. The object of the post-injection 3 is to enhance late mixing of fuel initially trapped in crevice volumes or of compounds that only partially oxidise in the combustion chamber, due to wall cooling or other effects, so as to improve late oxidation during combustion. Hence, the result of the post-injection is a slight increase in heat release, seen as a "bump" in the otherwise declining rate of heat release curve 4.

It should be appreciated that the number and exact timing of the subsequent injections may be varied. As stated above, there should be at least one subsequent injection.

Advantageously, there may be at least two subsequent injections. Preferably, the number of subsequent injections is less than 10. It is believed that between 1 and 10, preferably between 2 and 5, subsequent injections may be particularly useful.

Moreover, in FIG. 1 the illustrated first injection 1, subsequent injections 2, 3 (including the initial subsequent injections 2 and the post-injection 3) all have the same height and duration, i.e. they all include the same amount of fuel. This is naturally not necessary. Instead, the appearance of the injections may be varied as set out above in the summary of the invention. The initial subsequent injections 2, for instance, may differ from the first injection 1 and/or the final subsequent injection 3 (the post-injection). Moreover, the initial subsequent injections 2 need not be identical either.

Figure 2A:
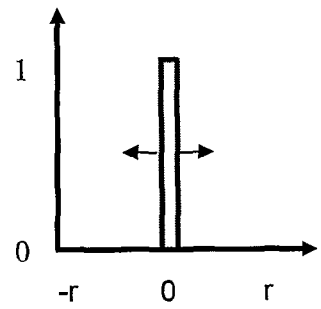
FIGS. 2a to 2c provide a schematic illustration of the flame propagation in the combustion chamber in a pre-mixed flame propagation combustion operation mode ("flame propagation mode")
Figure 2B:
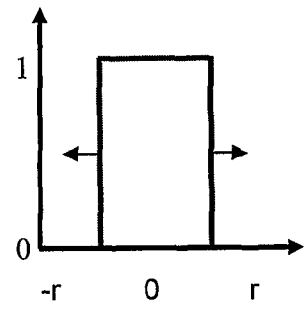
Figure 2C:
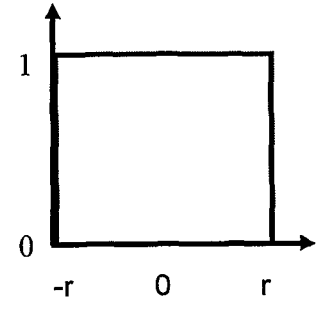

FIGS. 2a to 2c provide a (simplified) schematic illustration of the combustion process in the combustion chamber. The horizontal axis depicts the spatial position in the combustion chamber, where 0 denotes the centre axis of the chamber, and +/−r the transversal end walls thereof. The vertical axis illustrates the degree of completeness of the local combustion process where zero corresponds to no local combustion and one corresponds to complete local combustion.

FIG. 2a illustrates the situation at ignition using a method in accordance with the invention. For illustration and simplicity purposes, the combustion process is described to take place in one spatial dimension (the real combustion chamber has a complicated three dimensional geometry). Preferably, ignition and early combustion takes place in the central parts of the combustion chamber.

The subsequent flame propagation is illustrated by the arrows in FIGS. 2a and 2b. Once the flame has propagated across a specific position in the combustion chamber the degree of completeness of the local combustion process goes from zero (no local combustion) to one (complete local combustion). Eventually, as illustrated in FIG. 2c, the combustion is complete in all parts of the combustion chamber as the flame has propagated all the way to the transversal walls of the chamber.

Hence, FIGS. 2a to 2c are intended to illustrate the premixed flame propagation combustion being the combustion method to which the present invention relates. (Pre-mixed flame propagation combustion is the typical combustion process in engines of the gasoline-type.)

Figure 3A:
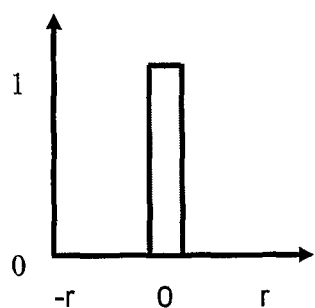
FIGS. 3a to 3c provide a schematic illustration of the combustion process in the combustion chamber in an operation mode distinguished by homogeneous ignition and combustion which is also referred to as "homogeneous combustion mode" which is hereby included for reference.
Figure 3B:
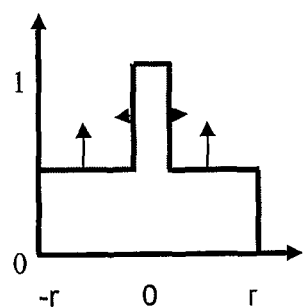
Figure 3C:
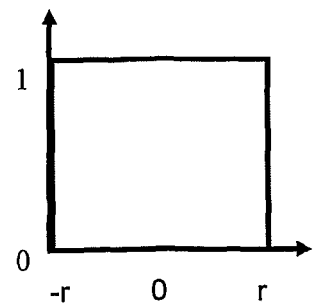

For reference only, it is referred to FIGS. 3a to 3c, which illustrate (in a simplified manner) another type of combustion, namely combustion in which the charge containing the first fuel is compressed to conditions close to Homogeneous Charge Compression Ignition (HCCI) of the first fuel. Such combustion methods may be described as distinguished by homogeneous ignition and combustion, and may be referred to as a "homogeneous combustion" type of combustion. The horizontal axis depicts the spatial position in the combustion chamber, where 0 denotes the centre axis of the chamber, and +/−r the transversal end walls thereof. The vertical axis illustrates the degree of completeness of the local combustion process, from zero (no local combustion) to one (complete local combustion).

As can be seen in FIG. 3a, the situation at ignition is similar to the one in FIG. 2a.

Preferably, ignition and early combustion take place in the central parts of the combustion chamber. However, with the homogeneous combustion-type of combustion, the flame propagates only marginally before auto-ignition takes place in all parts of the combustion chamber containing unburned fuel, as illustrated in FIG. 3b. Finally, as in FIG. 3c, combustion is complete in all parts of the combustion chamber.

Homogeneous ignition and combustion is sometimes referred to as a type of controlled advantageous auto-ignition process in contrast to uncontrolled auto-ignition that may cause disadvantageous knock. Typically, when using homogeneous combustion-type of combustion as in FIGS. 3a to 3c, complete combustion in all parts of the combustion chamber is reached quicker than in the pre-mixed flame propagation combustion example of FIGS. 2a to 2c.

The present invention is a method using flame propagation mode as described above. However, it has been realised that there may be provided a method of operating a dual fuel internal combustion engine of the diesel-type, comprising a combustion chamber being at least partly delimited by a piston, a first fuel supply for a first fuel, said first fuel supply being located in the combustion chamber or in an inlet port thereof, and a second fuel supply for a second fuel, where the method of operation may be switched between a flame propagation mode and a homogeneous combustion-type combustion mode.

The switching between operation modes may be accomplished by adjusting the amount of the second fuel in the first injection of the second fuel into the chamber and/or the timing of the first injection of the second fuel, so as to control the combustion chamber temperature and pressure after auto-ignition of the second fuel such that a selection between said operation modes is achieved.

For example, for remaining in a flame propagation mode, the first (ignition) injection of the second fuel should be made using a relatively small amount of fuel. If the amount of second fuel in said first injection of the second fuel is increased to a threshold amount, or exceeding it towards even larger amounts of second fuel, this alters the combustion process in the combustion chamber such that a homogeneous combustion mode is reached. Likewise, if running the engine in a homogeneous combustion mode, decreasing the amount of the second fuel in the first injection of the second fuel to a threshold amount or passing it towards even lower amounts of second fuel alters the combustion process in the combustion chamber such that the flame propagation mode is reached. Hence, the amount of the second fuel in the first injection may be used as a switch between modes.

This function is per se independent on whether subsequent injections (which may be injections of the second fuel or of another liquid or gaseous material) as described in the context of this application are present or not. However, it is understood to be particularly advantageous if combined with such a method.

Alternatively or in combination with variations of the amount of fuel injected in a first injection of the second fuel, the timing (i.e. the point in time when injection starts and the duration of the injection) of the first injection of the second fuel can be varied to select one of the two combustion operation modes. A selection of the homogeneous combustion-type operation mode can be made by arranging (i.e. by selecting the timing of injection) the auto-ignition of the second fuel to occur when the piston of the engine is close to a top dead position. A selection of the flame propagation mode can be made by arranging the auto-ignition of the second fuel to occur when the piston of the engine is farther from a top dead position.

The switching between operation modes may advantageously be performed at a lambda value (normalised air/fuel ratio) in the combustion chamber being between 1 and 3, preferably between 1.5 and 2.5, most preferably approximately 2.

Figure 4:
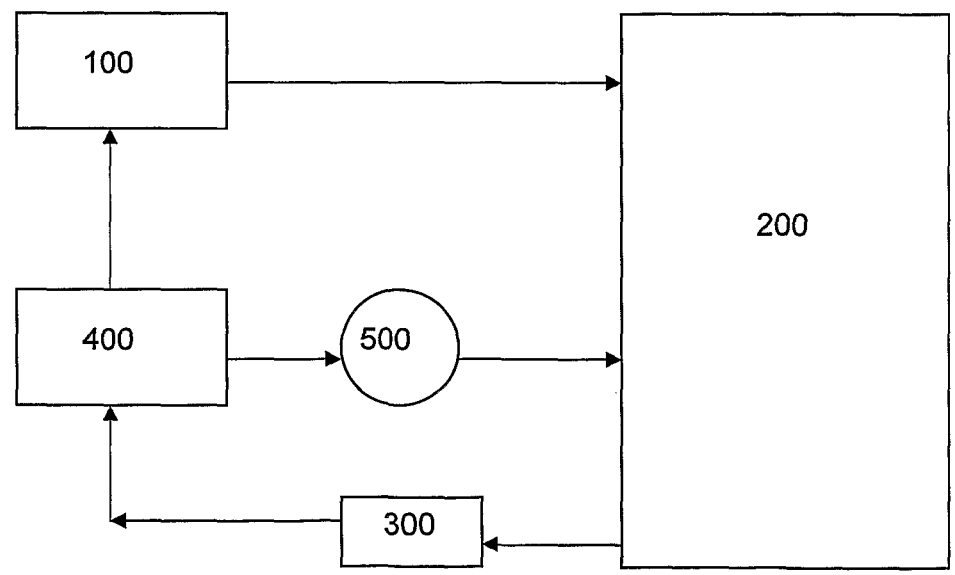
FIG. 4 provides a schematic illustration of a method and a dual fuel combustion engine in accordance with a preferred embodiment of the invention.

FIG. 4 is a block diagram schematically illustrating the function of a method and a dual fuel internal combustion engine in accordance with the invention.

A controller 400 is arranged to control combustion cycle initiation 100 and optionally any subsequent injections 500 for a combustion process 200 of a dual fuel internal combustion engine. The combustion cycle initiation 100, which includes the injection of the first fuel and the first injection of the second fuel into the combustion chamber of the internal combustion engine to initiate auto-ignition of said second fuel, thereby initiating conditions for flame propagation mode, and the (optional) subsequent injections 500 affect the combustion process 200. The combustion process 200 may be evaluated using one or more sensors 300 as described above. The sensors 300 provide feedback to the controller 400 which may adjust the combustion cycle initiation 100 and/or the subsequent injections 500 in accordance with said feedback.

In the illustrated example, one of the sensors 300 is depicted that provides a measure of the function of the combustion process. However, as described above, a sensor or sensors 300 could also be provided for measuring the quality of the fuel before it reaches the combustion chamber or other relevant parameters of the combustion process.

Moreover, it shall be understood that a plurality of sensors 300 may be arranged and evaluated for control of the subsequent injections 500.

The combustion cycle initiation 100 may optionally be set to control the first injection of the second fuel so as to select between a flame propagation mode and a homogeneous combustion mode of the engine.

It is to be understood that many embodiments and alternatives may be encompassed by the enclosed claims. Moreover, although the method relates to a method of operating an internal combustion engine of the diesel-type using two fuels, it is understood that such a method may be periodically used in a diesel-type engine which may during other periods also run on a single fuel. If a single fuel is used in the engine, some methods of operating the internal combustion engine, other than the one described herein, may be used. Hence, the method proposed herein may be one out of a number of operation methods used in one and the same engine.

The invention claimed is:

1. A method of operating a dual fuel internal combustion engine of the diesel-type, comprising a combustion chamber being at least partly delimited by a piston, a first fuel supply for a first fuel, the first fuel supply being located in or at the combustion chamber and/or in an inlet port thereof, and a second fuel supply for a second fuel, the method comprising the steps of:
   premixing the first fuel in the combustion chamber and/or in the inlet port,
   compressing the charge containing the first fuel to conditions that allow auto-ignition of the second fuel,
   performing a first injection of the second fuel into the combustion chamber to initiate auto-ignition of the second fuel for igniting the first fuel, thereby initiating conditions for pre-mixed flame propagation combustion of the first fuel, and
   performing at least one subsequent injection, the subsequent injection supplying additional kinetic energy into the combustion process to thereby enhance turbulence intensity and the propagation speed of the flame.

2. A method according to claim 1, wherein the subsequent injection is an injection of a liquid.

3. A method according to claim 1, wherein the amount of additional kinetic energy supplied is variable.

4. A method according to claim 3, wherein the amount of additional kinetic energy supplied is variable by varying at least one of: the number of injections, the injection pressures of the injections, the durations of the injections, the dwell times between injections.

5. A method according to claim 3, wherein the amount of kinetic energy supplied is varied in accordance with feedback supplied from at least one sensor.

6. A method according to claim 5, wherein the sensor is a sensor for sensing the quality of the supplied first fuel or a sensor for sensing the quality of the combustion.

7. A method according to claim 1, wherein the first fuel is a fuel with high octane number.

8. A method according to claim 1, wherein the first fuel is a gaseous fuel.

9. A method according to claim 1, wherein the second fuel is a fuel with high cetane number.

10. A method according to claim 1, wherein the second fuel is a liquid fuel.

11. A method according to claim 1, wherein the first fuel is pre-mixed with air and/or recycled exhaust gas.

12. A method according to claim 1, further comprising the step of performing a post-injection to enhance late mixing in the combustion chamber, so as to improve late oxidation during combustion of the remaining fuel.

13. A dual fuel internal combustion engine of the diesel-type comprising:
   a combustion chamber being at least partly delimited by a piston,
   a first fuel supply for a first fuel, the first fuel supply being located in or at the combustion chamber and/or in or at an inlet port thereof,
   a second fuel supply for a second fuel,
   the first fuel being pre-mixed in the combustion chamber and/or the inlet port,
   at least one device for compressing the charge containing the first fuel to conditions that allow auto-ignition of the second fuel,
   at least one injector device for performing a first injection of the second fuel into the combustion chamber to initiate auto-ignition of the second fuel for igniting the first fuel, thereby initiating conditions for pre-mixed flame propagation combustion of the first fuel,
and
   at least one injector device for performing at least one subsequent injection, so as to supply additional kinetic energy into the combustion process to thereby enhance turbulence intensity and propagation speed of the flame.

14. A dual fuel internal combustion engine according to claim 13, comprising at least one sensor for providing feedback from the combustion process, wherein the output of the at least one sensor is used for the control of the at least one subsequent injection.

15. A dual fuel combustion engine according to claim 14, wherein the at least one sensor is a sensor for sensing the quality of the combustion, or the quality of the supplied fuel.

16. A duel fuel combustion engine according to claim 13, wherein the at least one injector device is also for performing at least one post-injection for enhancing late mixing in the combustion chamber, so as to improve late oxidation during combustion of the remaining fuel.

* * * * *